(12) United States Patent
Nania

(10) Patent No.: US 9,266,416 B1
(45) Date of Patent: Feb. 23, 2016

(54) TRUCK COVER SYSTEM AND METHOD OF USING THE SAME

(71) Applicant: FORD GLOBAL TECHNOLOGIES, LLC, Dearborn, MI (US)

(72) Inventor: Adrian Nania, Rochester, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/447,874

(22) Filed: Jul. 31, 2014

(51) Int. Cl.
*B60P 7/02* (2006.01)
*B60J 7/04* (2006.01)
*B60J 7/19* (2006.01)

(52) U.S. Cl.
CPC *B60J 7/041* (2013.01); *B60J 7/198* (2013.01); *B60P 7/02* (2013.01)

(58) Field of Classification Search
CPC .............. B60J 7/041; B60J 7/198; B60P 7/02
See application file for complete search history.

(56) References Cited

U.S. PATENT DOCUMENTS

| | | | |
|---|---|---|---|
| 5,011,214 A | 4/1991 | Friesen et al. | |
| 5,961,173 A | 10/1999 | Repetti | |
| 6,893,072 B1 | 5/2005 | Graves | |
| 6,929,303 B1 | 8/2005 | Sharples | |
| 7,021,693 B2 | 4/2006 | Keller | |
| 7,320,494 B1 | 1/2008 | Wilson | |
| 2007/0210609 A1* | 9/2007 | Maimin | B60P 7/02 296/100.09 |
| 2008/0174142 A1 | 7/2008 | Pearlman | |
| 2010/0127529 A1* | 5/2010 | Elliott | B60J 7/141 296/100.09 |
| 2014/0312646 A1* | 10/2014 | Copp | B60J 7/041 296/100.12 |

FOREIGN PATENT DOCUMENTS

| | | | | |
|---|---|---|---|---|
| CA | 2316566 A1 * | 2/2001 | | B60J 7/041 |
| JP | WO 2009038025 A1 * | 3/2009 | | B60J 7/041 |

OTHER PUBLICATIONS

PowertraxPRO, Retrax, PopMech Editors Choice Awards 12, http:www.retrax.com/products/powertraxpro/, dated May 15, 2014.

* cited by examiner

*Primary Examiner* — Lori L Lyjak
(74) *Attorney, Agent, or Firm* — Jason Rogers; Law Firm of Dr. Junqi Hang, PLC (57) ABSTRACT

According to one or more embodiments, a truck cover system includes a panel cover including first and second panels connected via a first hinge, a track unit detachably receiving the first hinge, and a latch including first and second latch members detachably connected to each other, wherein a detachment between the first and second latch members causes detachment of the first hinge from the track unit.

19 Claims, 5 Drawing Sheets

TRUCK COVER SYSTEM AND METHOD OF USING THE SAME

TECHNICAL FIELD

The present invention generally relates to a truck cover system and a method of using the same.

BACKGROUND

For trucks with rear cargo beds, various designs of cargo bed covers have been provided in attempts to protect the cargo content. Certain of these existing designs are directed to a single panel that gets lifted up and opens in its entirety, which makes it difficult and if not all impossible to loading large objects like a refrigerator or a tall plant without the complete removal of the bed cover. For such a removal, the removed bed cover may need to be at least temporally stored inside the vehicle, taking up valuable space.

Other of some of the existing designs use soft covers; however these design based on soft covers may require manual roll-up and manual operation may not be user friendly as often being labor intensive.

Some of the existing designs involve motorized cover systems. For example, U.S. Pat. No. 6,983,072 B1 discloses similar systems.

SUMMARY

According to one or more embodiments, a cover system of a truck includes a cover panel including first and second panels connected via a first hinge, a track unit detachably receiving the first hinge, and a latch including first and second latch members detachably connected to each other, wherein a detachment between the first and second latch members causes detachment of the first hinge from the track unit.

The first latch member may be connected to the first hinge and the second latch member may be connected to the track unit.

The cover system may further include a second hinge connected to at least one of the first and second panels, wherein the second hinge may be connected to and movable along the track unit.

The track unit may include first and second tracks each positioned along a side wall of a truck bed of the truck.

The first and second tracks may each include a head portion, a body portion, and a toe portion, wherein the head portion and toe portion may be bent toward the bottom of the truck relatively to the body portion.

The cover system may further include a first belt and a second belt drivable by a motor, wherein a portion of the first belt and a portion of the second belt may be in contact with the first and second tracks.

The first and second panels may include at least one of steel, aluminum, fiberglass and carbon fiber.

The cover system may further include a third panel positioned next to and connected via a second hinge with the second panel, wherein the second hinge may be non-detachably connected to the track unit, such that the first and second panels are positioned relative to the third panel with a first elevation in a first operating position and with a second elevation different from the first elevation in a second operating position.

According to another one or more embodiments, a cover system of a truck includes first and second panels each including head and toe-sides, the head-side of the first panel and the toe-side of the second panel connected via a floating hinge, the toe-side of the first panel and the head-side of the second panel each connected to a non-floating hinge; and a track unit for driving the first and second panels via the hinges.

The cover system may further include a hinge cup to receive the floating hinge when the first and second panels are in a first operating position.

The non-floating hinges may each include an end portion which glides along a longitudinal axis of the track unit when the first and second panels change from the first operating position to a second operating position different from the first operating position.

The non-floating hinges may be connected to the track unit via a first cable.

The track unit may include a pair of tracks and a motor positioned there between, the pair of tracks being each positioned along a side wall of a truck bed of the truck.

The end portion of one of the non-floating hinges may contact a top surface of one of the pair of tracks.

The end portion of one of the non-floating hinges may contact a side surface of one of the pair of tracks.

According to another one or more embodiments, a method of providing covering to a truck includes providing a cover system to the truck, the cover system including first and second panels each including head and toe-sides, the head-side of the first panel and the toe-side of the second panel connected via a floating hinge, the toe-side of the first panel and the head-side of the second panel each connected to a non-floating hinge, and a track unit for driving the first and second panels via the hinges.

The track unit may be further provided to include a hinge cup to receive the floating hinge in a first operating position and to release the floating hinge in a second operating position.

The track unit may be further provided to include a latch, wherein the latch may include first and second latch members detachably connected to each other, and a detachment between the first and second latch members causes detachment of the floating hinge from the hinge cup such that the second operating condition is effectuated.

The toe-side of the first panel may lift off the truck bed while driving the cover panel from the first operation position to the second operating position.

One or more advantageous features as described herein will be readily apparent from the following detailed description of one or more embodiments when taken in connection with the accompanying drawings.

BRIEF DESCRIPTION OF THE DRAWINGS

For a more complete understanding of one or more embodiments of the present invention, reference is now made to the one or more embodiments illustrated in greater detail in the accompanying drawings and described below wherein.

DETAILED DESCRIPTION OF ONE OR MORE EMBODIMENTS

As referenced in the FIG.s, the same reference numerals are used to refer to the same components. In the following description, various operating parameters and components are described for different constructed embodiments. These specific parameters and components are included as examples and are not meant to be limiting.

As will be detailed herein elsewhere, the present invention in one or more embodiments is advantageous at least by providing a truck cover system believed to offer relatively enhanced security in cargo protection, relatively increased space utilization efficiency and relatively reduced noise generation.

In particular, and as described herein elsewhere, the cover system may include a panel cover having multiple panels connected via a concurrent use of floating and non-bloating hinges and drivable via a cable-like motorized track unit. Some of the benefits include the use of rigid panel materials with these two types of hinges that would not otherwise operable in certain of the existing designs. Accordingly, the partial open position may be effected and even locked via the synergistic combination of the cable system and both types of the hinges. Further, since the cover system may be installed above the truck bed, the cargo capacity may not be compromised.

In particular also, and with the employment of several hinges as described herein to tie down the panels while fully or partially covering the cargo bed, the panel cover is thus relatively secured to the cargo bed and hence noises due to movement collisions may be substantially reduced. In addition, portions of the panel cover that are folded during use are directed upward as opposed downward into the cargo bed. Therefore, the likelihood of the folded panels being in unwanted contact with the cargo content is reduced if not all diminished. As a result, operating noises associated with movement collisions between the panels and the cargo content are also substantially reduced.

Figure 1:
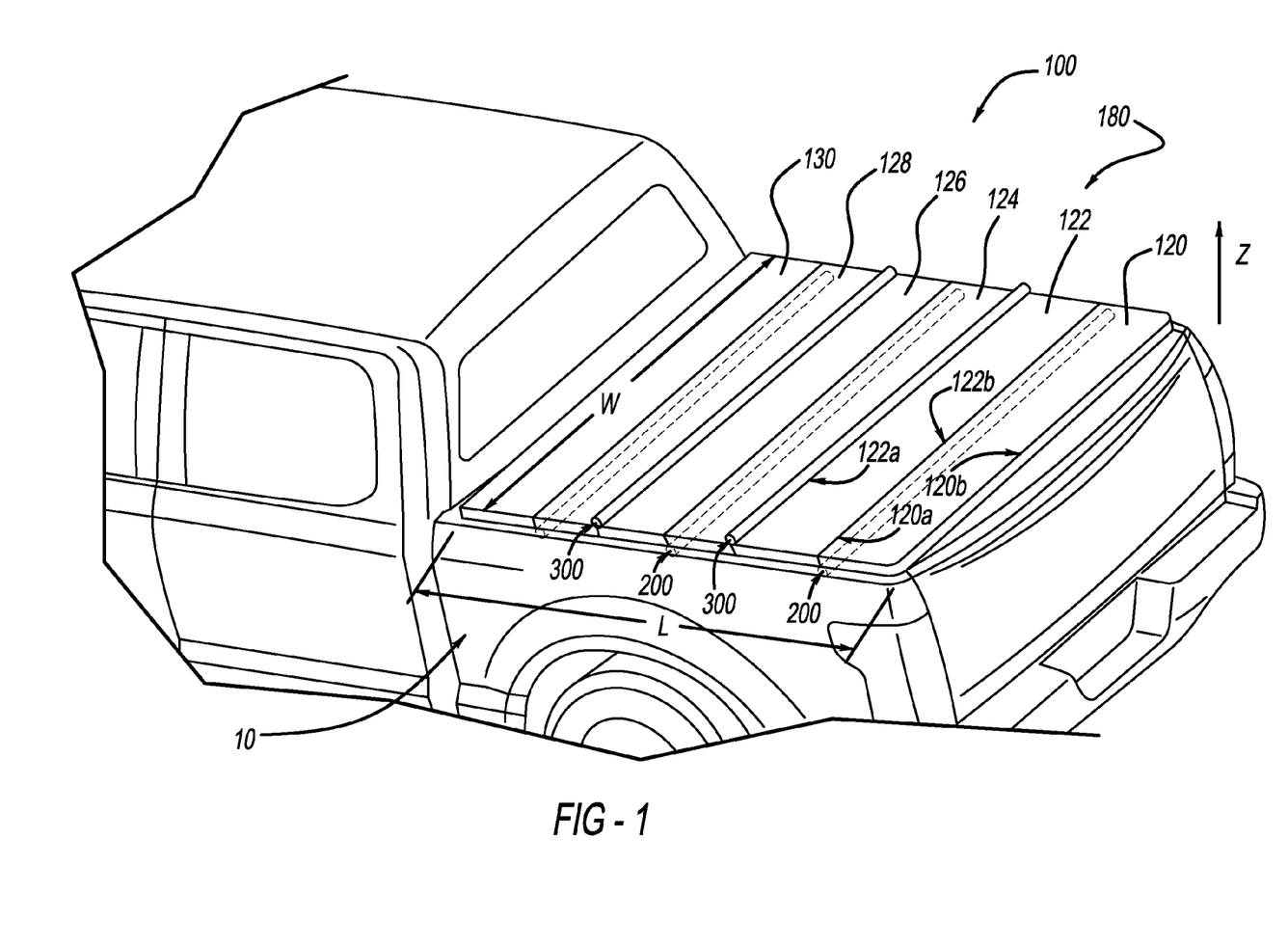
FIG. 1 illustratively depicts a truck cover system at a closed position according to one or more embodiments.
Figure 4A:
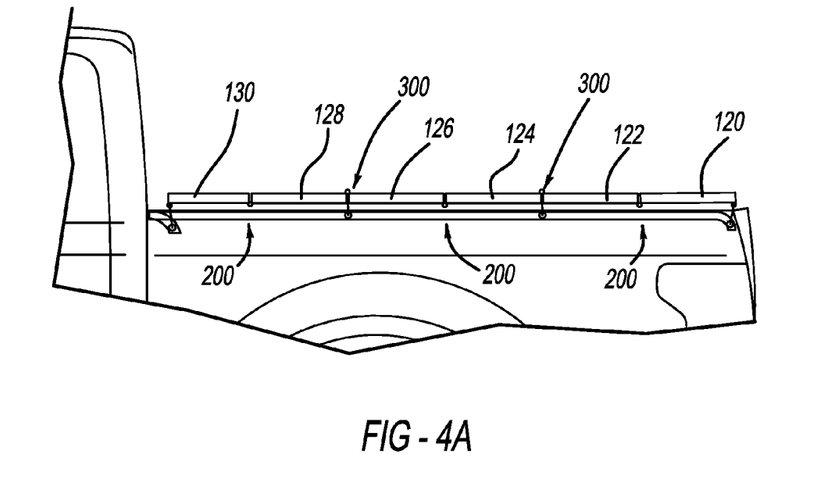
FIG. 4A illustratively depicts a cross-sectional view of the cover system referenced in FIG. 1 at a fully covered, closed position.

FIG. 1 and FIG. 4A illustratively depict, respectively, a perspective view and a cross-sectional view of a cover system generally shown at 100 as positioned relative to a truck bed 10 of truck 1 according to one or more embodiments. It is to be appreciated that term "truck" refers to any vehicle having a cargo area, with non-limiting examples thereof including light duty truck, heavy duty truck, and pickup.

The cover system 100 includes a panel cover 180, a track unit 500, and a latch 400. The panel cover 180 includes a first panel 120 and a second panel 122 connected to each other via a first hinge 200. As shown in FIG. 1 and further in view of FIG. 4B, the panel cover 180 may further include one or more panels such as panels 124, 126, 128 and 130 to accommodate particular needs in coverage size and folding specifics. In particular, the first panel 120 has a head-side 120a and a toe-side 120b, and the second panel 122 has a head-side 122a and a toe-side 122b. The head-side 120a of the first panel 120 is connected with the toe-side 122b via a first hinge 200. As described herein elsewhere, the first hinge 200 may be detachably received by the track unit 500. Therefore, the first hinge 200 may also be referred to floating hinge 200.

Similarly, the third and fourth panels 124, 126 may be connected via a connection including a hinge such as the floating hinge 200; and the fifth and sixth panels 128, 130 may be connected via a connection including a hinge such as the floating hinge 200.

Figure 3:
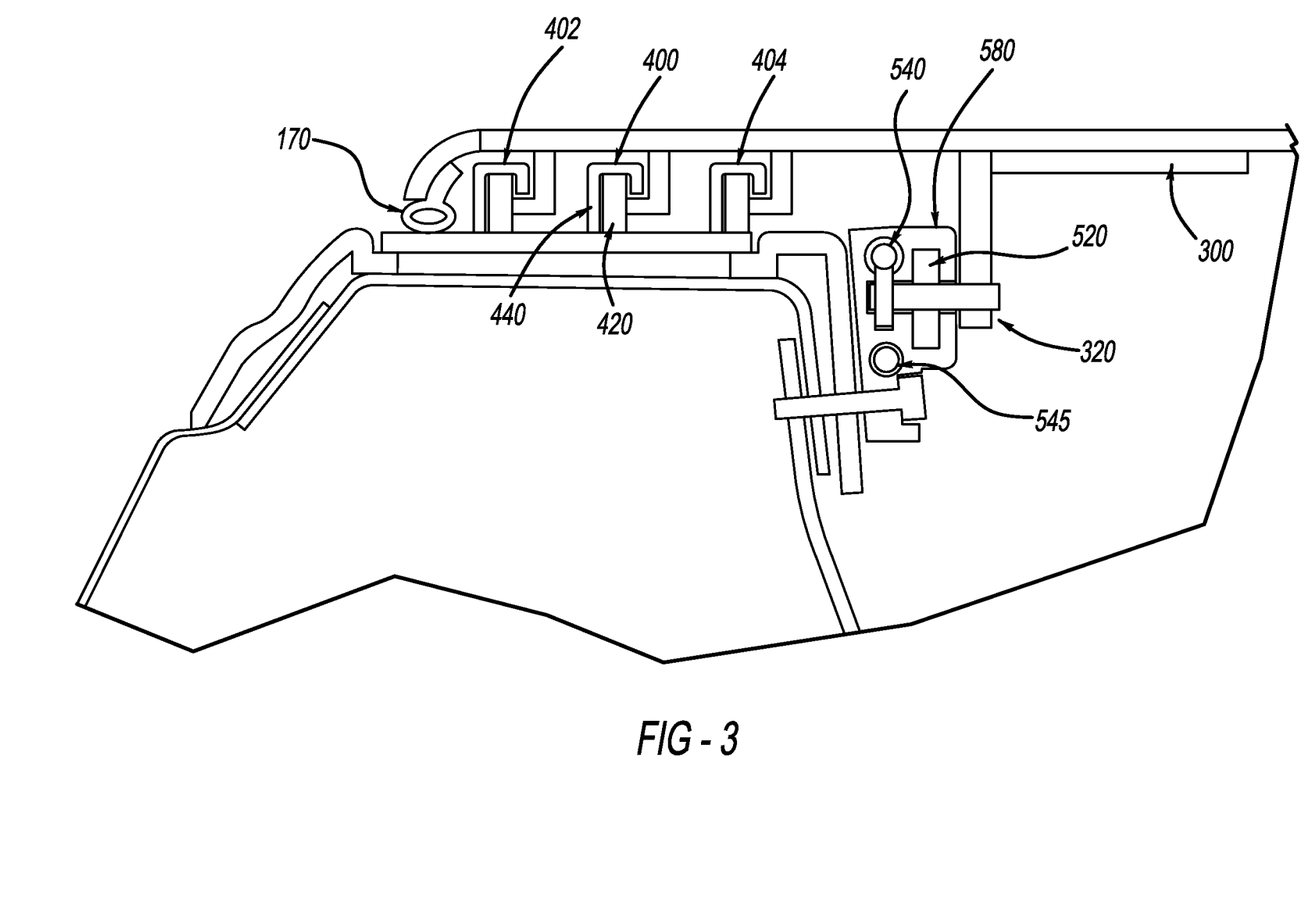
FIG. 3 illustratively depicts an enlarged, cross-sectional view of the track unit referenced in FIG. 2.

As depicted in FIG. 3, the latch 400 may include a first latch member 420 and a second latch member 440 detachably connected to each other, and a detachment between the first and second latch members 420, 440 causes detachment of the first hinge 200 from the track unit 500.

In one or more embodiments, the first latch member 420 may be connected to the first hinge 200. Optionally, the first latch member 420 may be part of the first hinge 200 and more particularly an end or distal portion of the first hinge 200. The second latch member 440 may be connected to the track unit 500. As described herein elsewhere, when the cover system 100 is in the fully closed position, the first latch member 420 engages the second latch member 440, which causes the first hinge 200 to attach to the track unit 500, such that the first and second panels 120, 122 at least temporally attached to the track unit 500. The second latch member 440 may be a hinge cup as illustratively depicted in FIG. 3. In other words, when the cover system 100 is in the fully closed position, the second latch member 440 may receive the floating hinge 200 via the first latch member 420. And when the cover system 100 is in ready-to-fold position, the first latch member 420 detaches from the second latch member 440, which causes the first hinge 200 to detach from the track unit 500, such that the first and second panels 120, 122 may be detached from the track unit 500. In the embodiments depicted in FIG. 3, the cover system 100 includes three latches 400, 402, 404, which each corresponds to one of the three panel pairs 126 and 124, 130 and 128, and 122 and 120.

Figure 4B:
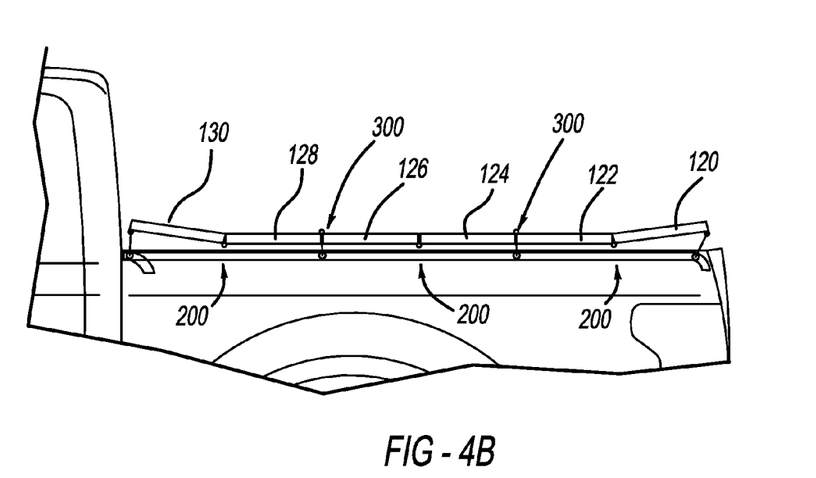
FIG. 4B illustratively depicts a cross-sectional view of the cover system referenced in FIG. 1 at a ready-to-fold position.

In one or more embodiments, and in view of FIG. 1 and FIGS. 4A-4B, the cover system 100 may include a second hinge 300 connected to at least one of the first and second panels 120, 122. In particular, as depicted in FIGS. 1 and 3, the toe-side 120b of the first panel 120 and the head-side 122a of the second panel 122 may each connect to one or more second hinges 300. Also, the panel pairs 124 and 126, 128 and 130 may connect with each other end to end. The second hinge 300 may be connected to and movable along the track unit 500. In certain instances, the second hinge 300 will not be detached from the track unit 500. Therefore, the second hinge 300 may also be referred to non-floating hinge 300.

In one or more embodiments and further in view of FIG. 3, the second hinge 300 includes an end portion 320, which glides along the track unit 500 when the first and second panels 120, 122 change from the first operating position to a second operating position different from the first operating position. In certain instances, the first operating position may be closed position, and the second operating position may be ready-to-fold position. For example, the end portion 320 may include a roller 520 which may slide along a channel of the first track 580. Roller 520 may be part of the track unit 500 and is free to slide along the truck bed rail such as 580, 590. So with the movement of the roller 520, along comes the movement of the panels. The most rearward panel such as panel 120 moves the entire cover 180. The drive cable such as the first belt 540 is attached to and pulls on the panel 120, which pushes on all the other panels including panels 122, 124, 126, 128 and 130. Panel 120 shown as the most rearward in FIG. 1 and panel 130 shown as the most forward in FIG. 1 may move horizontally and up the ramp.

Figure 2:
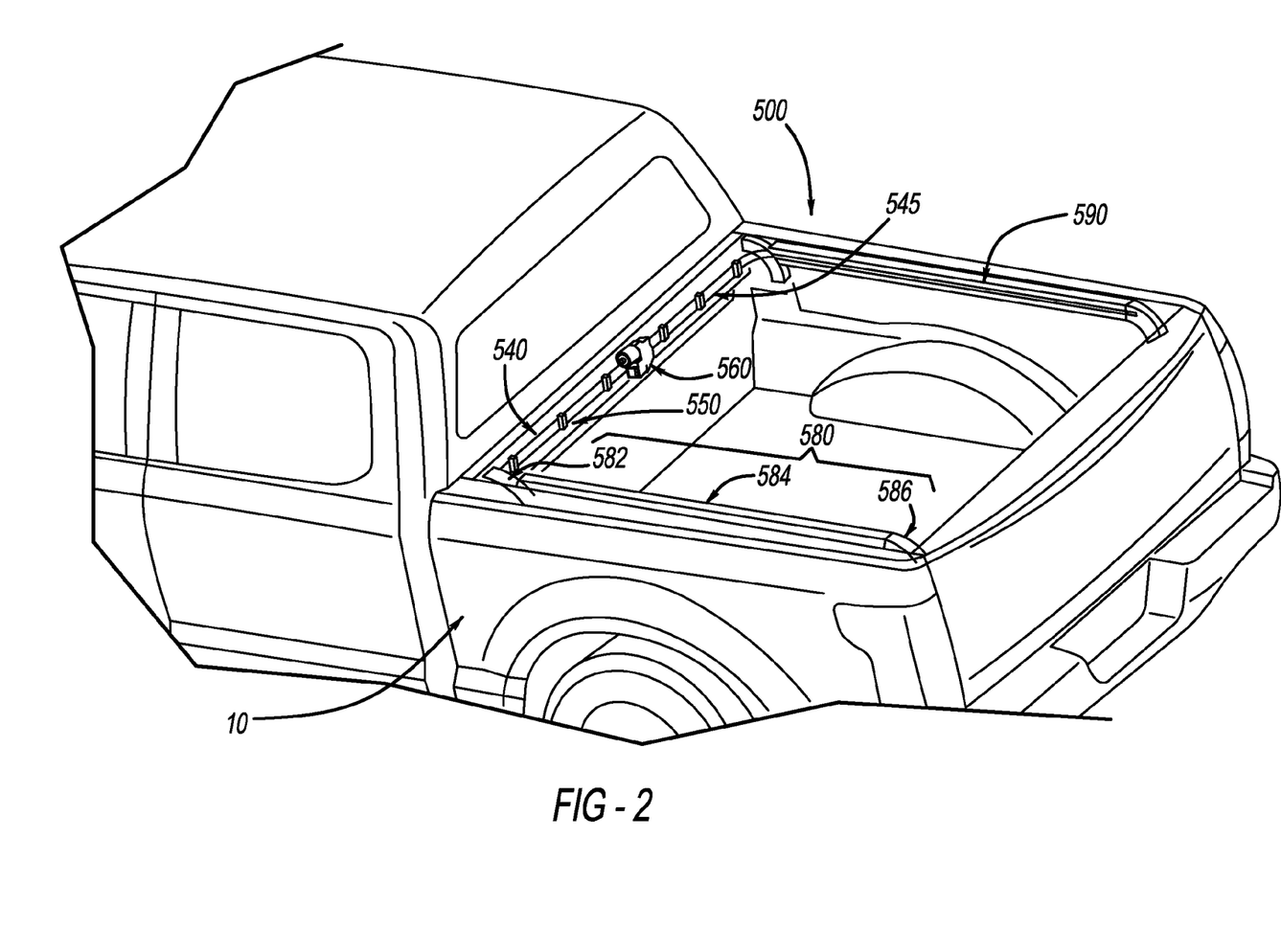
FIG. 2 illustratively depicts a track unit of the truck cover system referenced in FIG. 1.

As shown in FIG. 2 and FIG. 3, one or more studs 550 may be provided to stabilize the first and second belt 540, 545.

As detailed herein elsewhere, the roller 520 may be attached to the rearmost panel such as panel 120 and the foremost panel such as panel 130, which in turn is attached to the first belt 540. When the motor switch is actuated in an open position the first belt 540 pulls on panel 120 and panel 130 in a forward direction along the longitudinal axis "L" which causes the roller 520 to roll up the ramps in the track. This rolling-up causes the panel(s) to lift off the sealing surface. Lifting off the sealing surface reduces drag/friction on the seal and allows for clearance for the panel(s) to rotate.

In one or more embodiments, panels 130 and 128 which are shown as the most forward two panels in FIG. 1 have there between a floating hinge. Similarly panels 122 and 120 which are shown as the most rearward two panels in FIG. 1 have there between a floating hinge. In addition, panels 124 and 126 which are shown as middle positioned in FIG. 1 also have there between a floating hinge. As the floating hinges are positioned along the first and second tracks 580, 590, one or more connectors such as the floating and/or non-floating hinges described herein may be provided between the two end floating hinges 200 between the panel pairs along a width direction "W", for instance, a direction traverses a longitudinal axis "L". The one or more connectors may be hinge pins with axis in the "W" direction to connect any two adjacent panels and secure relative position between thereof. As depicted in FIG. 2, the track unit 500 may be installed on the truck bed 10 and include a first track 580, a second track 590, and a motor 560 positioned there between. Tracks 580, 590 may be each positioned along a side wall of the truck bed 10. In other embodiments (not shown), tracks 580, 590 may be positioned along the front wall and the rear wall of the truck bed 10, wherein the front wall may be close to the truck cab and the rear wall may be close to the rear end of the truck 1. The motor 560 may be fastened to the front wall of the truck bed 10, and may be opened from a key-fob, IP mounted switch, or exterior mounted switch. The track unit 500 may further include a first belt 540 and a second belt 545 drivable by the motor 560. A portion of the first belt 540 and a portion of the second belt 560 may be in contact with the first and second tracks 580, 590, respectively. Optionally, the motor 560 drives both belts 540, 545 and both belts are driven at the same time through a motor pinion gear.

Referring back to FIGS. 2 and 3, the end portion 320 of the second hinge 300 may be connected with the first belt 540. As driven by motor 560, the first belt 540 then causes the end portion 320 to move along the first track 580. Similarly, the second belt 545 may drive the end portion (not shown) of the second hinge 300 which may be located within the second track 590 to slide along the second track 590. In other words, the first belt 540 may function as the drive belt for the first track 580, and the second belt 545 may function as the drive belt for the second track 590.

In one or more embodiments, the first track 580 may include a head portion 582, an elongated body portion 584, and a toe portion. The head portion 582 and the toe portion 586 may act as lift ramps, function to permit the first and last panels 130, 120 to rotate without unnecessary interference, and may also remove and apply the seal loads to the panel cover 180. The head portion 582 and the toe portion 586 may each independently be integral or structurally separate from the body portion 584. If structurally separate, the head portion 582 and/or the toe portion 586 are in belt or cable communication with the first track 580. The head portion 582 and the toe portion 586 may be of any suitable shapes as long as they function to permit the panels up for rotation. In certain designs and as depicted in FIG. 2, the head portion 582 and toe portion 586 may bend toward the bottom of the truck bed 10 relatively to the body portion 584. In particular, the head portion 582 and/or toe portion 586 may extend towards the bottom of the truck bed 10 along a vertical or height direction "Z".

In one or more embodiments and as depicted in FIG. 2 and FIG. 3, the first track 580 may include a channel-like recess to receive and guide a gliding movement of the end portion 320 of the second hinge 300. In another one or more embodiments, the first track 580 may include a channel-like recess on its top surface, such that the end portion 320 of the second hinge 300 may contact the top surface of the first track 580. The first belt 540 may be the cable that is attached to the end portion 320 such that the second hinge 320 may be pulled and pushed via the end portion 320 and the first belt 540.

In one or more embodiments, the cover system 100 may further include a seal 170, which may connect to the cover panel 120 and be next to the track unit 500. The seal 170 may be formed of any suitable materials, with non-limiting examples thereof including rubber materials such as EPDM rubber (ethylene propylene diene monomer rubber. The seal 170 may be indirectly next to the truck bed 10 via track unit 500, or may be directly next to the truck bed 10 without anything there between. In particular, the seal 170 may be configured to extend along the entire perimeter of the panel cover 180 and its connection to the truck bed may be strengthened with the use of adhesive tapes such as pressure sensitive tapes.

In one or more embodiments, the first and second panels 120, 122 may include a generally rigid material, including but not limited to steel, aluminum, fiberglass and carbon fiber. In particular, and as described herein elsewhere, the cover system may include multiple panels connected via a concurrent use of floating and non-bloating hinges and drivable via a cable-like motorized track unit. Some of the benefits include the use of rigid panel materials with these two types of hinges that would not otherwise operable in certain existing truck cover designs. Accordingly, the partial open position may be effected and even locked via the synergistic combination of the cable system and both types of the hinges.

Non-limiting examples of the cover system 100 may be operated are described herein below in view of the drawings.

As depicted in FIG. 1 and FIG. 4A, the cover system 100 is in the closed position. The first latch member 420 engages the second latch member 440, and the latch 400 is engaged, which causes the first hinge 200 to attach to the track unit 500. Both of the latches 402, 404 may be similarly engaged. Accordingly, panels 120 through 130 may be secured to the track unit 500 or the truck bed 10, the seal 170 forms a seal around the track unit 500 or the truck bed 10, such that the truck bed 10 is covered. To reduce or eliminate fluid leakage through any possible spaces between any two adjacent panels, certain seals may also be employed between the panels along the "W" direction. For instance, bulb seals may be used to run along the "W" direction between any two panels, wherein the bulb seal is attached to one panel and compressed against the other.

Then, the motor 560 may drive the first belt 540 and/or the second belt 545. The end portion 320 of the first hinge 200 may be driven leftward. As stated herein elsewhere, the motor 560 may drive simultaneously both the first and the second belts 540, 545. The term "leftward" refers to the direction towards the driver or truck operator. In this way, the panel pair 120 and 122 may be driven by the motor 560 to move leftward.

As described herein elsewhere, the panel cover 180 may include or be entirely formed of a rigid material. Therefore, the panel pair 120 and 122 may be rigid and sturdy enough to force panel pairs 124 and 126, and 128 and 130 in turn to move upward and leftward, to effectuate the change from the ready-to-fold position as depicted in FIG. 4B to the fully open position as illustratively depicted in FIG. 4D. To disengage the latch 400, the first latch member 420 may be operated to detach from the second latch member 440, and thereafter the first hinge 200 detaches from the track unit 500. Both of the latches 402, 404 may each be disengaged in a similar fashion. In operation, the latches 400, 420 and 404 may be disengaged all at the same time. Also, the end portion 320 of the second hinge 300 may move toward the body portion 584 from the toe portion 582 of the first track 580, which causes the toe-side 120b of the first panel 120 to be lifted up off the truck bed 10. Additionally, the seal 170 may also detach from the track unit 500 of truck bed 10.

Figure 4C:
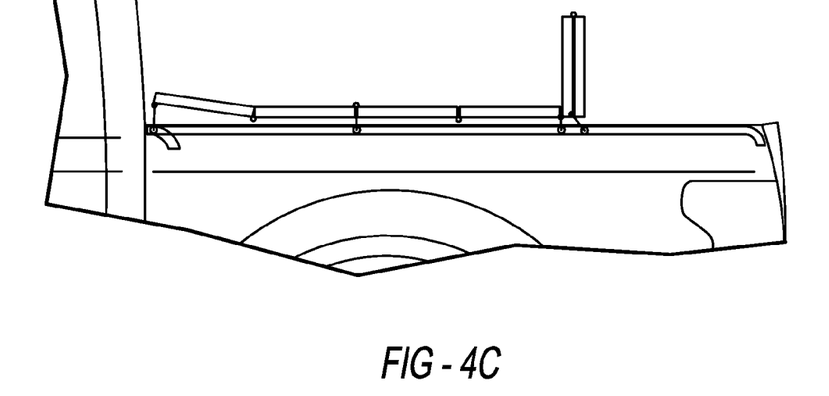
FIG. 4C illustratively depicts a cross-sectional view of the cover system referenced in FIG. 1 at a partially folded position.

The motor 560 may further drive the movement of the panel cover 100 from its ready-to-fold position as illustratively depicted in FIG. 4B. The end portion 320 moves along the first track 580 towards the driver side, which causes the first panel 120 to push up the second panel 122, while panels 124, 126, 128, and 130 maintain substantially unmoved on the truck bed 10, to effectuate a partially folded position of the cover system 100 as illustratively depicted in FIG. 4C. As mentioned herein elsewhere, the panel cover 180 may be locked while being in a partially folded position. The partial folding may be realized as the foremost panel 130 and/or the rearmost panel 120 are connected to the belts, wherein the belt or the cable stops the folding movement of the panel cover 180 also stops. In this connection, the partial folding position is maintained because the motor 560 may not support reverse movement of the belts.

Figure 4D:
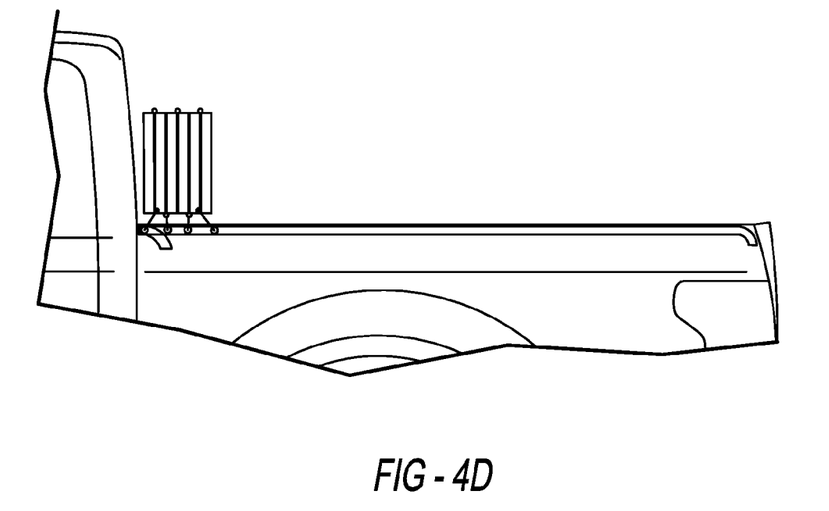
FIG. 4D illustratively depicts a cross-sectional view of the cover system referenced in FIG. 1 at a fully folded, open position.

The motor 560 may further drive the movement of the end portion 320 towards the driver side via the first belt 540, which causes the panels 124, 126, 128, and 130 to sequentially move upward and fold in turn, so as to effectuate a folded position as illustratively depicted in FIG. 4D. Optionally, one or more rearview cameras may be used to guide the vehicle operation when the panel cover 180 is fully folded as shown in FIG. 4D.

It is to be appreciated that the cover system 100 may be operated conversely from the fully folded or the open position to the fully closed position via one or more intermediate partially folded positions as detained herein elsewhere. This may be initiated and effectuated via a reverse operation of the track unit 500 as driven by the motor 560.

As stated in the specification, the present invention provides a cover system of a truck, and a method to of providing covering to a truck. However, one skilled in the art will readily recognize from such discussion, and from the accompanying drawings and claims that various changes, modifications and variations can be made therein without departing from the true spirit and fair scope of the invention as defined by the following claims.

What is claimed is:

1. A cover system of a truck, comprising:
   a panel cover including first and second panels connected via a first hinge;
   a track unit detachably receiving the first hinge; and
   a latch including first and second latch members detachably connected to each other, wherein a detachment between the first and second latch members causes detachment of the first hinge from the track unit.

2. The cover system of claim 1, wherein the first latch member is connected to the first hinge and the second latch member is connected to the track unit.

3. The cover system of claim 2, further comprising a second hinge connected to at least one of the first and second panels, the second hinge being connected to and movable along the track unit.

4. The cover system of claim 1, wherein the track unit includes first and second tracks each positioned along a side wall of a truck bed of the truck.

5. The cover system of claim 4, wherein the first and second tracks each includes a head portion, a body portion, and a toe portion, the head portion and toe portion protruding outwardly away from the truck bed.

6. The cover system of claim 4, further comprising a first belt and a second belt drivable by a motor, a portion of the first belt and a portion of the second belt being in contact with the first and second tracks, respectively.

7. The cover system of claim 1, wherein the first and second panels each independently include at least one of steel, aluminum, fiberglass and carbon fiber.

8. The cover system of claim 1, further comprising a third panel positioned next to and connected via a second hinge with the second panel, the second hinge being non-detachably connected to the track unit.

9. The cover system of claim 1, wherein the panel cover further includes third, fourth, fifth and sixth panels, the third panel connected to the second panel via a non-floating hinge, the fourth panel connected to the third panel via a floating hinge, the fifth panel connected to the fourth panel via a non-floating hinge, and the sixth panel connected to the fifth panel via a floating hinge.

10. A cover system of a truck, comprising:
    a first panel including a first head-side and a first toe-side;
    a second panel including a second head-side and a second toe-side, the first head-side of the first panel and the second toe-side of the second panel connected via a floating hinge, the first toe-side of the first panel connected to a first non-floating hinge and the second head-side of the second panel connected to a second non-floating hinge;
    a track unit for driving the first and second panels via the hinges; and
    a latch including first and second latch members detachably connected to each other, wherein a detachment between the first and second latch members causes detachment of the floating hinge from the track unit.

11. The cover system of claim 10, further comprising a hinge cup to receive the floating hinge when the first and second panels are in a first operating position.

12. The cover system of claim 10, wherein the first and second non-floating hinges each including an end portion which glides along a longitudinal axis of the track unit when the first and second panels change from the first operating position to a second operating position different from the first operating position.

13. The cover system of claim 10, wherein the first and second non-floating hinges are connected to the track unit via a first belt.

14. The cover system of claim 13, wherein the track unit includes a pair of tracks and a motor positioned there between, the pair of tracks being each positioned along a side wall of a truck bed of the truck.

15. The cover system of claim 14, wherein an end portion of one of the first and second non-floating hinges contacts a top surface of one of the pair of tracks.

16. The cover system of claim 14, wherein an end portion of one of the first and second non-floating hinges contacts a side surface of one of the pair of tracks.

17. A method of providing covering to a truck, comprising:
providing a cover panel to the truck, wherein the cover panel includes first and second panels connected via a first hinge, a track unit detachably receiving the first hinge, and a latch including first and second latch members detachably connected to each other, wherein a detachment between the first and second latch members causes detachment of the first hinge from the track unit.

18. The method of claim 17, wherein the track unit is further provided to include a hinge cup to receive the first hinge in a first operating position and to release the first hinge in a second operating position.

19. The method of claim 18, further comprising lifting a toe-side of the first panel off a truck bed of the truck while driving the cover panel from the first operation position to the second operating position.

* * * * *